No. 634,489. Patented Oct. 10, 1899.
E. H. WALKER.
ANIMAL TRAP.
(Application filed May 15, 1899.)
(No Model.) 2 Sheets—Sheet 1.
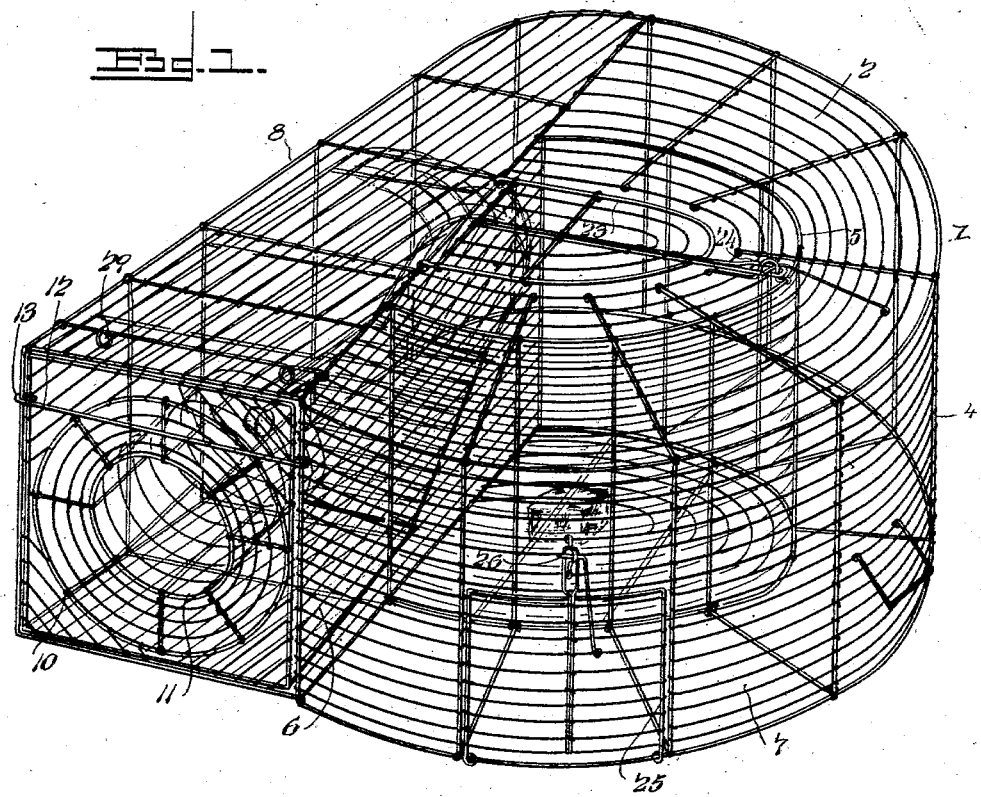
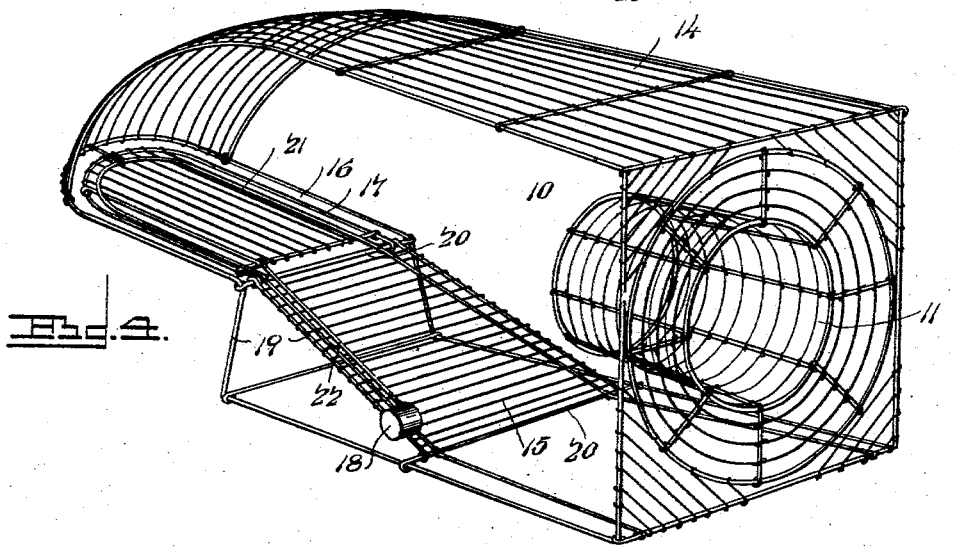
Witnesses E. H. Walker Inventor

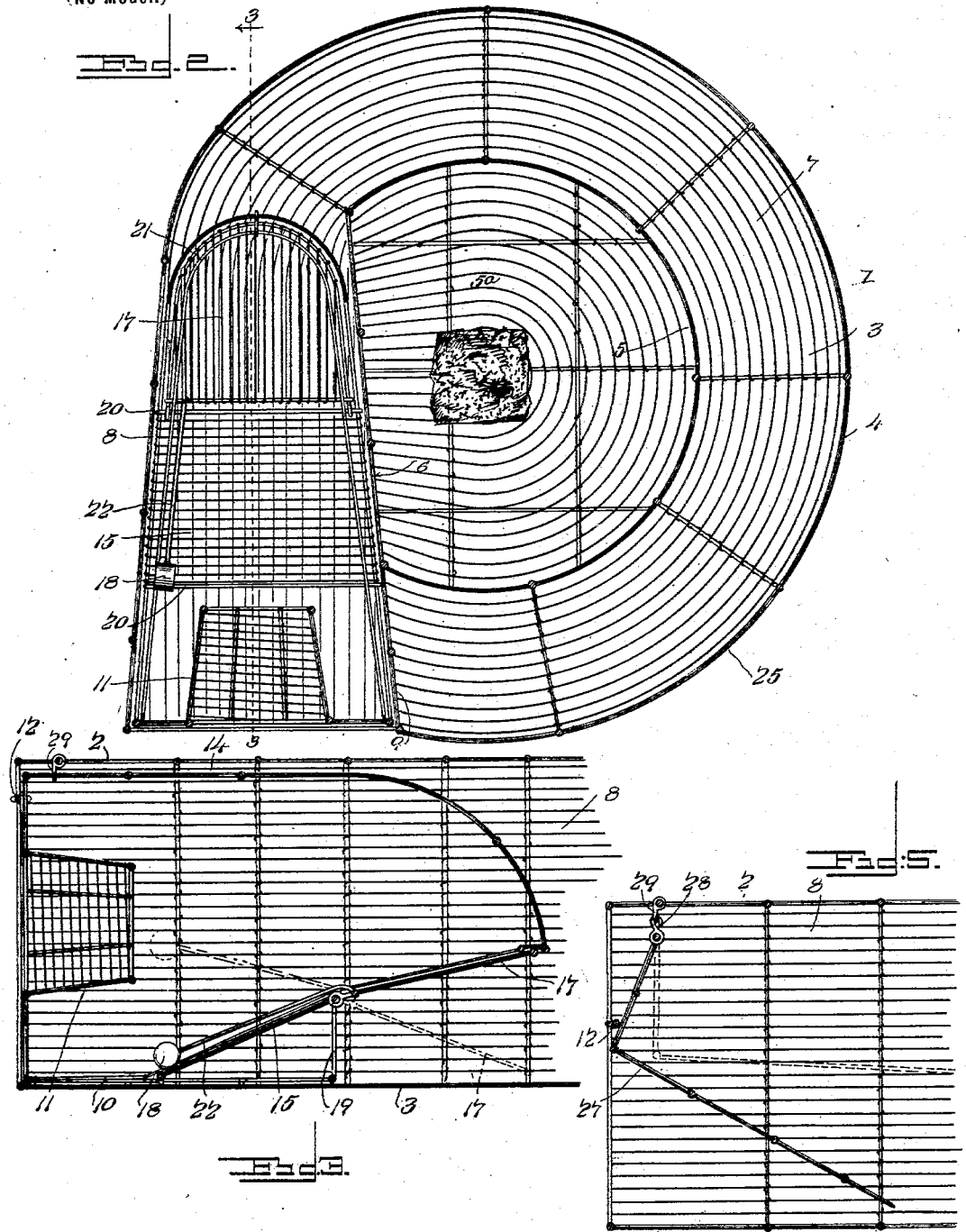

UNITED STATES PATENT OFFICE.

EDWARD HARISON WALKER, OF DUMAS, MISSISSIPPI.

ANIMAL-TRAP.

SPECIFICATION forming part of Letters Patent No. 634,489, dated October 10, 1899.

Application filed May 15, 1899. Serial No. 716,924. (No model.)

*To all whom it may concern:*

Be it known that I, EDWARD HARISON WALKER, a citizen of the United States, residing at Dumas, in the county of Tippah and State of Mississippi, have invented a new and useful Animal-Trap, of which the following is a specification.

The invention relates to improvements in animal-traps.
The object of the present invention is to improve the construction of animal-traps and to provide a simple, inexpensive, and efficient one of great strength and durability designed for capturing a large variety of animals and capable of automatically setting itself and of preventing the captured animals from obtaining access to the bait.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention. Fig. 2 is a horizontal sectional view of the same. Fig. 3 is a vertical sectional view on line 3 3 of Fig. 2. Fig. 4 is a detail perspective view of the removable frame which carries the entrance-funnel. Fig. 5 is a vertical sectional view similar to Fig. 3, a hinged door being substituted for the removable frame to adapt the trap for catching fish, rabbits, and the like.

Like numerals of reference designate corresponding parts in all the figures of the drawings.

1 designates a substantially cylindrical casing or cage comprising a top 2, a bottom 3, and a vertical wall 4, forming the sides of the trap or cage and extending entirely around the same to within a short distance of one corner of the device to provide an entrance-opening. Within the cage or casing is arranged a substantially cylindrical bait-receptacle consisting of a vertical wall 5 and spaced from the sides of the cage or casing. The vertical wall 5 of the central bait-receptacle 5ª is provided with an extension 6, arranged at one side of the entrance-opening and closing the intervening substantially annular space 7 between the walls of the bait-receptacle and the cage. One side of the cage is flattened or straight at 8, and the adjacent portion 9 of the wall of the bait-receptacle is also straight, the straight portions 8 and 9 forming the walls of the entrance and converging inwardly, as clearly illustrated in Fig. 2 of the accompanying drawings. By this arrangement of cage and bait-receptacle a substantially circular run or compartment is provided around the latter for the reception of the captured animals, which are prevented from obtaining access to the bait. This run or space 7 extends from the entrance-opening to the wall or extension 6, by which it is closed.

When the trap is employed for catching rats, minks, and the like, a removable frame 10, carrying an entrance-funnel 11, is arranged within the straight outer portion of the intervening space 7 and is secured therein by a horizontal cross-rod 12, arranged at the entrance-opening and provided at its terminals with hooks 13 for engaging the cage or casing at opposite sides of the entrance-opening. The removable frame is provided with a substantially rectangular front, and the entrance-funnel 11 extends inward from the center thereof. The top 14 of the frame is tapering to conform to the configuration of the straight portion of the passage or run, and it curves inward and downward at its inner end and terminates above the bottom of the trap or cage. The bottom of the frame is provided with an inclined portion 15, extending upward and inward from a point near the center of the frame to a substantially U-shaped opening 16, at which is hinged a trap-door 17, held normally closed by a weight 18, in which position it forms a continuation of the inclined bottom portion 15. The inclined bottom portion 15 is connected with the front of the frame by side wires, and it is supported by substantially L-shaped portions 19 of the side wires, the horizontal members of the L-shaped portion 19 being connected by transverse wires or rods 20. The frame is provided around the door-opening 16 with a stop-wire 21, conforming to the configuration of the opening and being of less width than the hinged trap-door, and this stop-wire, which is located above the trap-door, is adapted to limit the upward movement of the same.

The trap-door 17 is hinged at the upper end of the inclined portion 15, and it is provided at one side with an arm 22, to which the weight 18 is connected. The weight 18, which may be of any desired construction, is adapted to be counterbalanced by an animal treading upon the hinged door, which when it is opened precipitates the animal falling and causes it to enter the rear portion of the passage or run, and the desire of an animal to obtain access to the bait will be sufficient to cause it to proceed into the trap. As soon as the animal leaves the trap-door the latter closes automatically and prevents the return and escape of the animal. Sufficient space is provided between the rear end of the removable frame and the bottom of the trap to afford a passage-way for the animal.

When the trap is designed for catching minks, it is preferably baited with live chickens, which are introduced into the bait-compartment through the top, which is provided with a door 23, held closed by a suitable fastening device 24, and as the captured animals cannot obtain access to the bait the chickens will not be injured. When it is baited for rats and other animals, the bait-receptacle is supplied with any substance which will attract the animals to be captured. The captured animals are removed from the passage or run at a point near the rear end thereof, the vertical wall of the cage or casing being provided with a door 25, hinged at the bottom and secured at the top by a suitable fastening device 26. The fastening devices of the said doors preferably consist of loops or hasps carried by the doors and hooks mounted on the latter and adapted to engage staples or loops projecting from the cage or casing.

When the trap is employed for catching fish, the frame and the entrance-funnel are removed and a hinged door 27 is suspended within the tapering portion of the passage or run at the entrance-opening by means of hooks 28, which engage eyes 29 of the top of the cage or casing, and the said door 27, which is substantially L-shaped in longitudinal section, is supported by the transverse rod, with its inner end slightly above the bottom of the cage or casing. The door consists of a series of L-shaped wires connected at intervals by transverse wires and having their inner ends pointed and adapted to prevent effectually the return and escape of an animal. The hinged door, which is adapted to be lifted by fish passing beneath it, may also be employed for catching rabbits, and when baited for fish it may be readily placed within a brook, stream, or pond.

The invention has the following advantages: The trap, which is simple, inexpensive, strong, and durable, is adapted for catching a variety of animals, and it is capable of preventing the captured animals from obtaining access to the bait, so that a large number of animals may be captured without replenishing the bait. The frame which carries the entrance-funnel and which is removably mounted in the entrance portion of the passage or run may be readily detached when it is desired to convert the device into a fish-trap.

Changes in the form, proportion, size, and the minor details of construction within the scope of the appended claims may be resorted to without departing from the spirit or sacrificing any of the advantages of this invention.

What is claimed is—

1. A device of the class described comprising a cage or casing having an entrance-opening, a bait-receptacle arranged within and spaced from the walls of the cage or casing, forming an intermediate passage or run, and a device arranged within the passage or run and adapted to prevent the return of the animal, substantially as described.

2. A device of the class described comprising a cage or casing provided with an entrance-opening, a bait-receptacle arranged within the cage or casing and spaced from the sides thereof to provide a passage or run, the walls of the bait-receptacle being provided at the entrance-opening with an extension closing one end of the passage or run, and a device arranged within the same at the other end thereof to prevent the return of animals, substantially as described.

3. A device of the class described comprising a substantially cylindrical cage having an entrance-opening and flattened at one side of the same to provide a straight side wall, an inner bait-receptacle spaced from the walls of the cage or casing and forming an intervening passage or run entirely surrounding it, one side of the bait-receptacle being straight and provided with an extension located at the entrance-opening and closing one end of the passage or run, and a hinged door arranged within the passage or run near the entrance-opening, substantially as described.

4. A device of the class described comprising a cage or casing having an interior bait-receptacle and provided around the same with a passage or run, an entrance-opening into said passage or run, a removable frame mounted within the cage or casing at the entrance-opening and provided with an entrance-funnel, and a door located in rear of the entrance-funnel, substantially as described.

5. A device of the class described comprising a cage having an interior bait-receptacle and provided around the same with a passage or run, a removable frame mounted in the passage or run and comprising a front or outer portion having an entrance-funnel, a top extending downward and inward, and an inclined bottom portion, and a trap-door mounted on the frame in rear of the inclined bottom portion, substantially as described.

6. A device of the class described comprising a cage having a passage-way, a removable frame mounted in the passage-way and provided at its front with an entrance and having its top extended downward and rearward and terminating short of the bottom of the cage or casing, said frame being provided at its bottom with an inclined portion and having an opening in the rear of the same, and a trap-door mounted in the said opening, substantially as described.

7. A device of the class described comprising a cage or casing having an entrance-opening, a frame detachably mounted therein and comprising a vertical front having an entrance, a top extending downward and rearward from the front, and a bottom having an inclined portion and provided in rear of the same with an opening and having a stop located above and extending around said opening, and a hinged door mounted in the said opening, abutting against the said stops and provided with means for holding it normally closed, substantially as described.

In testimony that I claim the foregoing as my own I have hereto affixed my signature in the presence of two witnesses.

EDWARD HARISON WALKER.

Witnesses:
J. C. FANT,
J. W. STREET.